Aug. 9, 1966   P. B. HARTUPEE   3,264,900
DIFFERENTIAL
Filed June 14, 1962   7 Sheets-Sheet 5

INVENTOR.
Perry B. Hartupee
BY
Harness, Dickey & Pierce
ATTORNEYS

Aug. 9, 1966  P. B. HARTUPEE  3,264,900
DIFFERENTIAL

Filed June 14, 1962  7 Sheets-Sheet 7

INVENTOR.
Perry B. Hartupee
BY
Harness, Dickey & Pierce
ATTORNEYS 3,264,900
DIFFERENTIAL
Perry B. Hartupee, Dearborn, Mich., assignor to Powr-Lok Corporation, a corporation of Michigan
Filed June 14, 1962, Ser. No. 202,528
21 Claims. (Cl. 74—711)

The present invention relates to improvements in a locking differential mechanism.

A conventional two-wheel drive bevel gear vehicle differential provides substantially equal torque to the driving wheels from the engine. A well known disadvantage of such a differential is its ineffectiveness when one drive wheel is on a low traction surface. In such an instance this wheel will spin even though the other driving wheel is on a high traction surface. A vehicle will not move from a standing position under such circumstances.

Also, when one driving wheel bounces from the traveled surface or road, it will accelerate, since the momentary traction presented to the wheel is zero. The bouncing wheel returns to the road rotating at a speed faster than the other driving wheel. This causes fishtailing, tire wear, and drive line shock.

Therefore, it is an object of the present invention to provide a differential construction which "locks-up" or provides adequate torque when one wheel encounters a low traction condition but which will differentiate when one wheel goes faster than the other as when turning a corner.

It is another object of the present invention to provide a locking differential which is simple in construction, relatively inexpensive to manufacture, and which operates quickly, smoothly, efficiently, and noiselessly.

It is another object of the present invention to provide such a locking differential of simple construction which automatically adjusts to load demand.

It is another object of the present invention to provide a locking differential which minimizes gear tooth strain and wear; which minimizes noise and scoring of the locking surfaces; and which has no effect on steering control when installed in a vehicle.

Other objects and advantages of this invention will become readily apparent from a reading of the following description and a consideration of the related drawings wherein:

FIG. 5 is a view similar to FIG. 1 showing another embodiment of the invention using a one-piece case;

Referring to FIGS. 1–4 of the drawings, the first embodiment of my invention is shown with a two-piece differential case. The differential and axle housing in which the mechanism of this invention is carried is shown generally in phantom at 10. A drive pinion 12 is shown in engagement with the differential ring gear 14. The drive pinion 12 is rotated by a suitable power source (not shown).

The differential case is composed of the case body 15 and the case cap 16. The body and cap are flanged and connected to the ring gear 14 by suitable means such as the cap screws 18. Thus, a single fastening means is used to connect the case sections together, and at the same time fasten them to the ring gear. The case is rotatably supported in the housing 10 by roller bearings 20 and 22.

Side gears 24 and 26 are disposed in the case and are backed by the thrust washers 28 and 30. Axle shafts 32 and 34 are splined to the inside of the side gears 24 and 26. Disposed between the side gears is a spider, which in this instance is a single round pin 36 which uses snap rings 38 and 40 as retainer means to keep the pin from falling out. Two pinions 42 and 44 are disposed to rotate on the spider pin 36 in toothed engagement with side gears 24 and 26.

Two pressure rings 46 and 48 overlie opposite sides of the pinions. These pressure rings provide curved (preferably circular) cam surfaces, such as 50 and 52 indicated in FIG. 2, which are adapted to engage the round spider pin 36. The pressure rings have outwardly extending lugs, such as 54 and 56, which are slidably disposed in lateral grooves 58 in the case whereby the rings 46 and 48 rotate with the case but can move parallel to the axis of the case (the axis of the case being the coaxial axes of axles 32 and 34).

Locking means is provided which is actuated by the pressure rings 46 and 48. In this instance, the locking means comprises a plurality of clutch discs and plates. The clutch plates 60 and 62 are positioned around the hub of left side gear 24. These clutch plates have outwardly extending ears 64 and 66 which are slidably positioned in the case grooves 58 so that these plates rotate with the case. Clutch discs 68 and 70 are disposed in this instance on each side of plate 62 and include inwardly extending splined portions which engage splines on the hub of said gear 24 so that these discs rotate with the side gears. If desired, the two clutch discs can be positioned together, reducing the total friction surface. Various numbers of plates and discs will provide various combinations of locking surfaces dependent upon the method of stacking.

On the right side of the differential, similar discs 72, 76 and plates 74, 78 are provided.

Oil openings 80 are provided in the differential case to make certain that the lubricant is adequately distributed to the moving surfaces. These are large enough to avoid interference with normal movement of the spider pin 36 on cam surfaces 50 and 52.

Figures 6, 7:
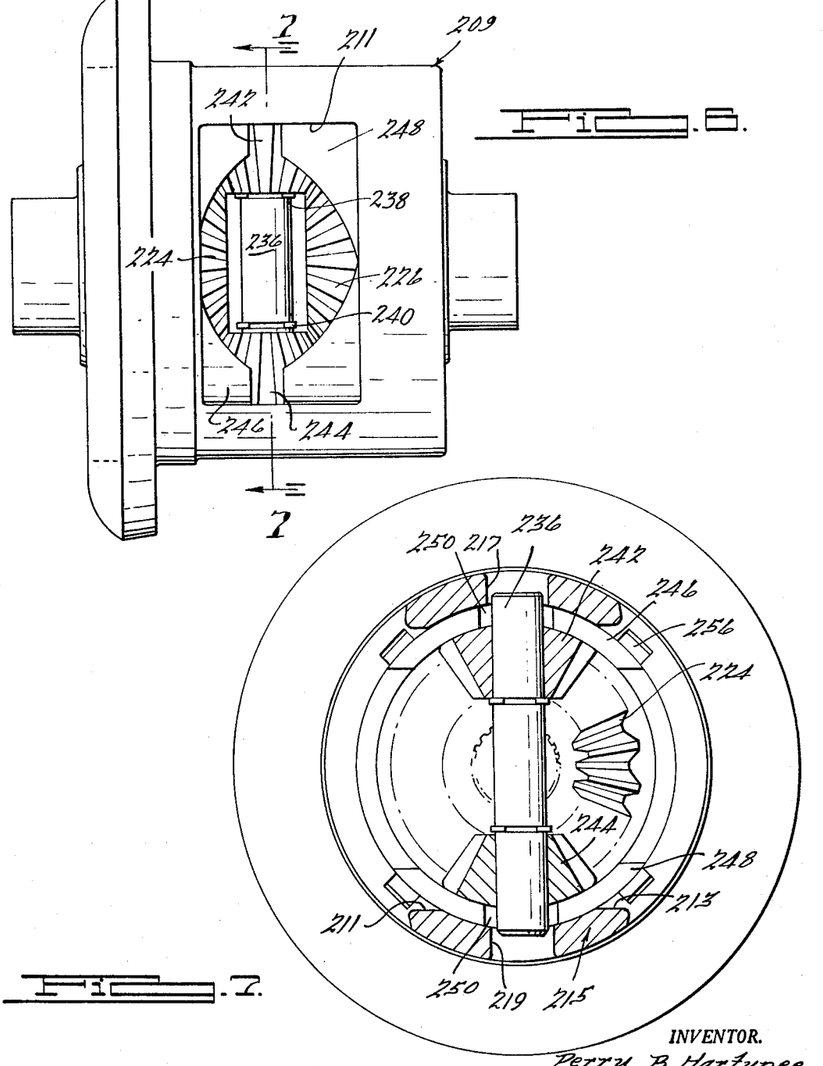
FIG. 6 is an elevational view of the locking differential shown in FIG. 5.
FIG. 7 is a sectional view taken along the line 7—7 of FIG. 6.

FIGS. 5-7 of the drawings show my invention embodying a one-piece case. Parts which are the same as those shown in FIGS. 1-4 are given the same number in a "200" series. The case in this embodiment is indicated at 209. There are two rectangular openings 211 and 213 in the opposite sides of case 209. The pressure rings 246 and 248 are suitably cut-out on the sides to permit insertion of the gears and this also permits them to be inserted through side openings 211 or 213.

The unit is assembled by inserting the thrust washers, side gears, clutches, and pressure rings in through the opening 211 or 213 in case body 215. The pinions 242 and 244 are then inserted through one of the openings 211 or 213, and aligned with holes 217 and 219. Next the spider pin 236 is inserted through the holes 217, 219 and through the pinions 242, 244. Snap rings 238 and 240 are then inserted through openings 211 or 213 and affixed in place.

Referring to FIGS. 1-4 of the drawings, the general locking operation of the device is accomplished when the differential case 15, 16 is rotated by the power source. The rings 46 and 48 rotate with the case and the curved cam faces 50 and 52 move against the floating spider pin 36 which is now restrained by the vehicle driving wheels through the side gears and pinions causing the rings to spread apart from each other in a sidewise direction parallel to the axis of shafts 32 and 34. This applies force to the clutch plates and discs so that both axles 32 and 34 can be rotated directly by the case through the clutch mechanism rather than through the differential gear mechanism.

There is a substantial clearance provided at 90 between the side gears and the adjacent faces of the pressure rings, to permit free independent axial or sidewise movement between the rings and side gears. The hubs 92 of the side gears therefore transmit side gear thrust (from the bevel gear teeth) directly into the thrust washers 28 and 30 without any application of such force to the clutch means and consequently without any tendency of side gear loads to operate the clutch means. Pinion thrust from the curved outside surfaces of pinions 42 and 44 is transmitted into flat tangent surfaces 94 on the pressure rings.

In operation of the device of FIGS. 1-4 as applied to an automobile, power is applied from the engine and drive line (not shown) in the conventional manner to rotate the drive pinion 12. The drive pinion 12 rotates the ring gear 14 and the differential case 15, 16 which is affixed thereto. As the case is rotated, into the plane of the drawing paper for example, the pressure rings 46 and 48 and the clutch plates 60, 62, 76 and 78 are rotated with it. The spider 36 is not connected to the case, but is in a floating condition between the cam surfaces. The clutch discs 68, 70, 72, 74 are engaged with the hubs of side gears 24 and 26.

Figures 8, 9, 10, 11, 12:
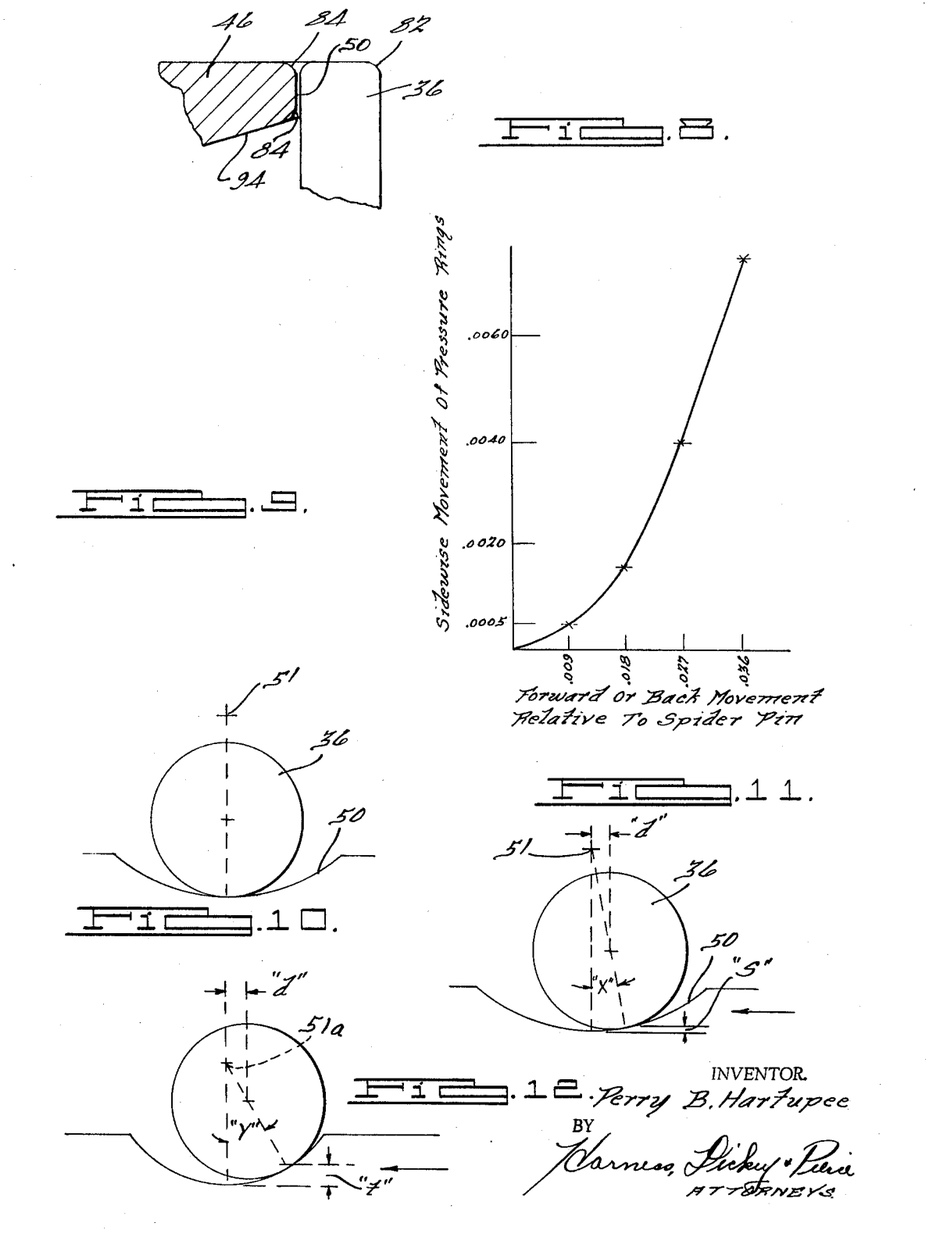
FIG. 8 is a fragmentary view of a spider pin and pressure ring showing certain critical corners rounded for stress relief.
FIG. 9 is a graphic representation for a particular arrangement, which indicates sidewise movement of the pressure rings on the vertical graph axis (ordinate), and forward or rearward movement of the spider on the horizontal graph axis (abscissa)
FIG. 10 is a schematic view demonstrating the neutral position of the spider pin relative to the curved cam surface of one of the pressure rings, the differential being in unlocked condition.
FIG. 11 is a schematic view similar to FIG. 10 showing the position of the pin when the unit is locked.
FIG. 12 is a schematic view similar to FIG. 11 showing a curved cam surface with a shorter radius of arc, and wherein the pin is moved the same distance from the neutral position as the pin in FIG. 11.

As the cam surfaces 50 and 52 (FIG. 2) of the pressure rings 46 and 48 (now rotating with the case) engage the round spider pin 36 which is now restrained, the cam surfaces 50 and 52 move up on the spider pin 36 to a position such as shown in FIG. 11 or 12. As the pressure rings move up on the pin, they spread apart sidewise toward opposite ends of the case. This movement exerts pressure against the clutch stacks 60, 62, 68, 70 and 72, 74, 76, 78. When this occurs the side gears 24 and 26 are locked to the case for rotation therewith through the clutch means. Since there is only one pin 36 the forces on both sides of the clutches are equal at all times and in direct proportion to torque demand.

Most of the torque during straightaway driving is transmitted to the wheels through the clutch means rather than through the gears. Clearance is provided between the pitch lines of the side gears and pinions and the bores of the pinions and spider shaft to allow the pinions to have a tendency to float free while the spider is in lock-up position, thus putting most or all of the propulsion load on the clutch.

When the device unlocks, as under differential action in a turn, it appears that the following theory applies;

Assuming a right turn with the differential shown in FIGS. 1-4, the inside side gear 26 of the turn slows down to the speed of the inside wheel (not shown) which is below case rotation speed. The outside wheel in the turn (not shown) increases the rotational speed of side gear 24 so that it is faster than the case rotational speed. When this happens, the spider 36 is moved toward and to the neutral position shown in FIGS. 2 and 10. Now the sidewise thrust is removed from the pressure rings and clutch mechanism and the unit can differentiate in a conventional manner.

FIGURE 8 shows a portion of the spider pin 36 and pressure ring 46. The spider pin 36 is in engagement with the curved cam surface 50 on the pressure ring 46. To make sure that the contact between surface 50 and pin 36 is located centrally of the surface 50, the corners 82 and 84 may be rounded as shown in FIG. 8.

Since work in must equal work out (work equalling force times the distance through which it moves) it will be appreciated that the curved shape of the cam means provided by spider pin 36 and cam surfaces 50 and 52 gives a very high force (small movement) in the initial stages of pin 36 displacement from a neutral position. This is indicated graphically in FIG. 9 which shows the relationship between forward and backward movement of the pressure ring with respect to the pin (cam operating movement) to the resulting sidewise movement of the pressure ring (cam actuated movement). As can be seen, the ratio between these movements is high in the early stages of cam operation and then falls off substantially. The curve plotted in FIG. 9 shows the relationships for a 0.375 inch round spider pin 36 and a 0.625 inch circular cam surface 50 or 52. This data indicates that for a cam operating movement (abscissa) of .009 inch there is a cam actuated movement (ordinate) of 0.0004, or a ratio of 22.5. Thus, the sidewise clutch operating force exerted by the pressure ring is multiplied 22.5 times. When the cam operating movement is 0.036, the sidewise pressure ring movement is 0.0072 so that the ratio is 5 and the force multiplication has fallen off to 5. The foregoing figures indicate the theoretical relationships dictated by the geometry of the parts. In an actual working unit, I prefer to employ dimensions and clearances such that the actual total spread of the pressure rings required for a full lock-up from a neutral position is in the neighborhood of .005-.007 inch.

For manufacturing reasons it is desirable to keep both the pin 36 and the cam surfaces 50, 52 of circular form. FIGS. 10-12 illustrate how the curve of FIG. 9 may be varied nevertheless to obtain an optimum relationship of locking force to cam operating movement. In FIGS. 10 and 11 a relatively large radius cam surface 50 is shown, its center being point 51. A cam operating movement of $d$ occurs between the neutral position of FIG. 10 and the position of FIG. 11 as the pin 36 travels through an angle of X relative to the surface 50. Sidewise or cam actuated movement of the ring is $s$. In FIG. 12, the radius of surface 50 has been shortened to 51a and it will be seen that for the same cam operating movement $d$, the angle of travel has increased to Y and the sidewise pressure ring movement has increased to $t$. The locking force applied in FIG. 11 is therefore substantially larger than that applied in FIG. 12. In actual units the contact angles, such as X or Y, are in the neighborhood of 12 to 20 degrees.

It will be seen, therefore, that by adjustment of the relative radii of pin 36 and cam surfaces 50 and 52 it is possible to obtain the optimum locking and unlocking force characteristics and that the present cam design inherently provides an optimum relationship of locking and unlocking force and movement to load and to pressure ring movement.

FIGS. 11–12 also indicate that the locking force between the pin 36 and a cam surface 50 or 52 may be defined by the equation $F = kT$ cotangent $X$, where F is the force, $k$ is a constant, T is the input torque, and X is the contact angle between neutral and the position at which the sidewise force on a pressure ring is to be determined.

Figure 1:
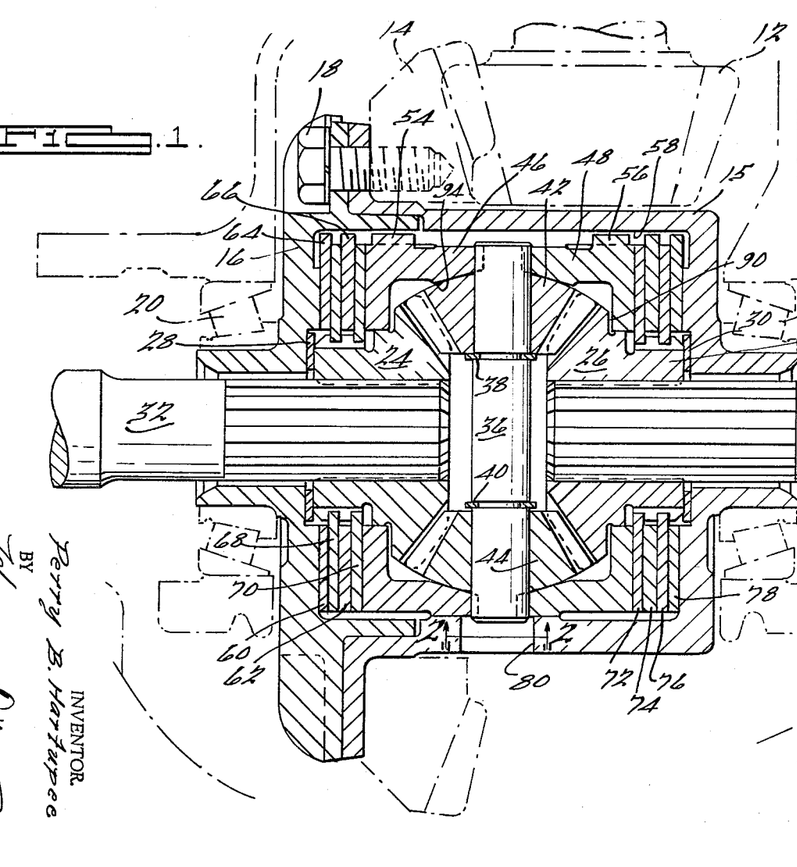
FIGURE 1 is a rear mid-sectional elevation of a locking differential embodying the present invention installed in the driving axle assembly of a vehicle, the axle housing and differential housing being shown in phantom, and the spider pin and pinion gears being rotated into the plane of the paper as compared with FIG. 4.
Figure 2:
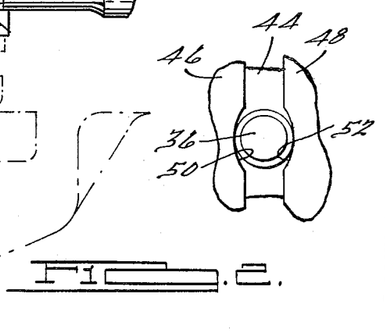
FIG. 2 is a fragmentary view taken along the line 2—2 of FIG. 1.
Figures 3, 4:
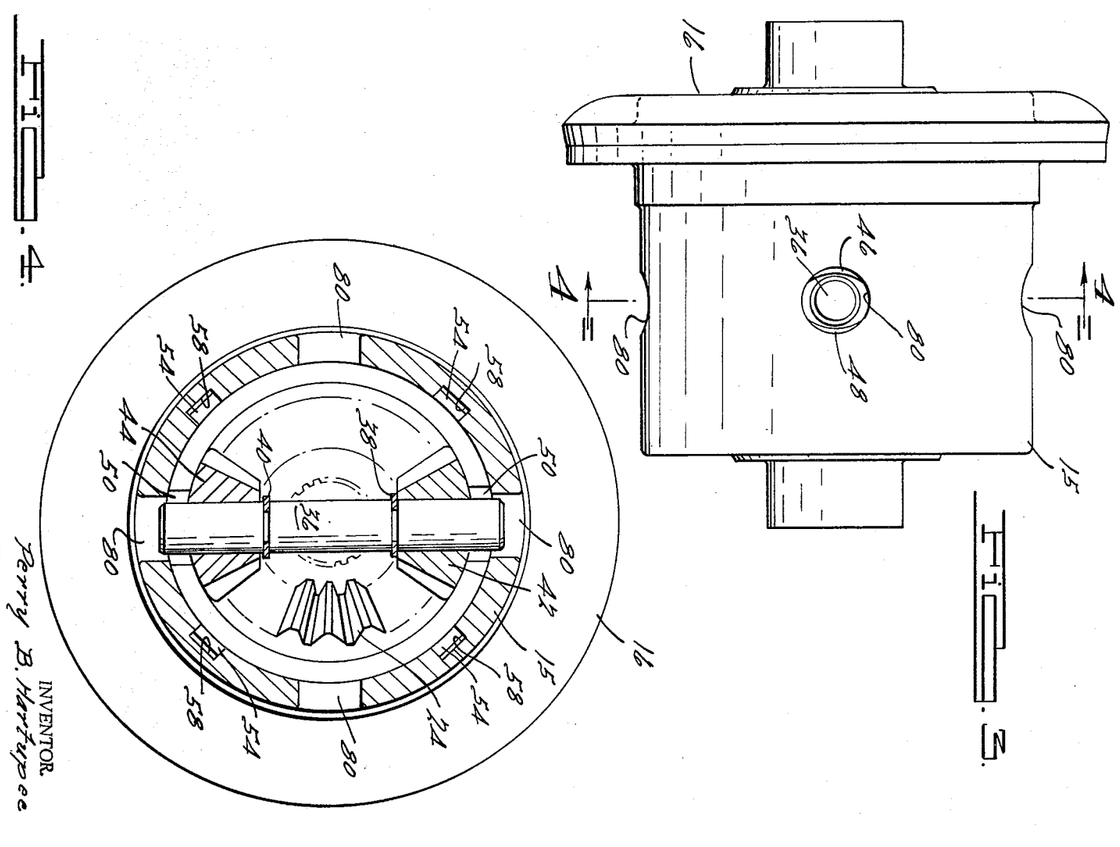
FIG. 3 is a top view of the differential shown in FIG. 1.
FIG. 4 is a sectional view taken along the line 4—4 of FIG. 3.
Figure 3:
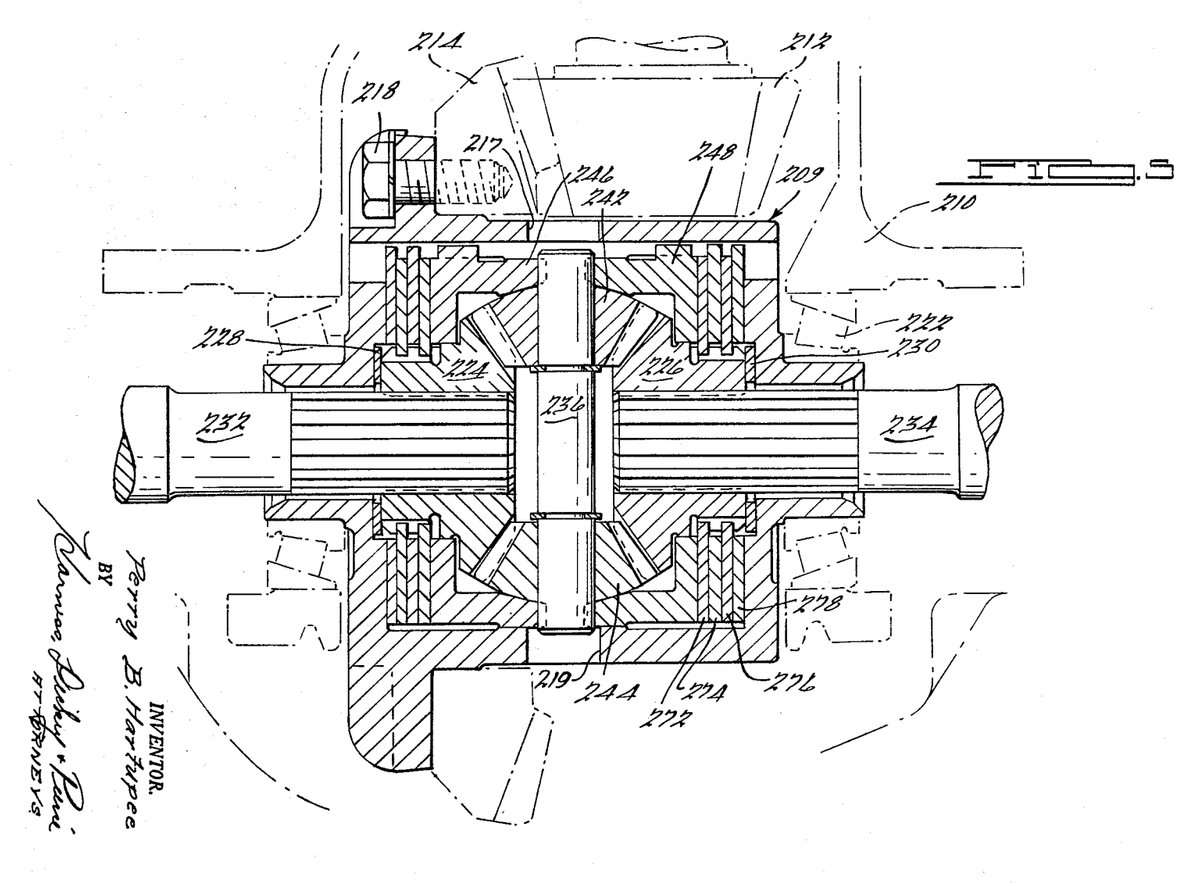
Figure 13:
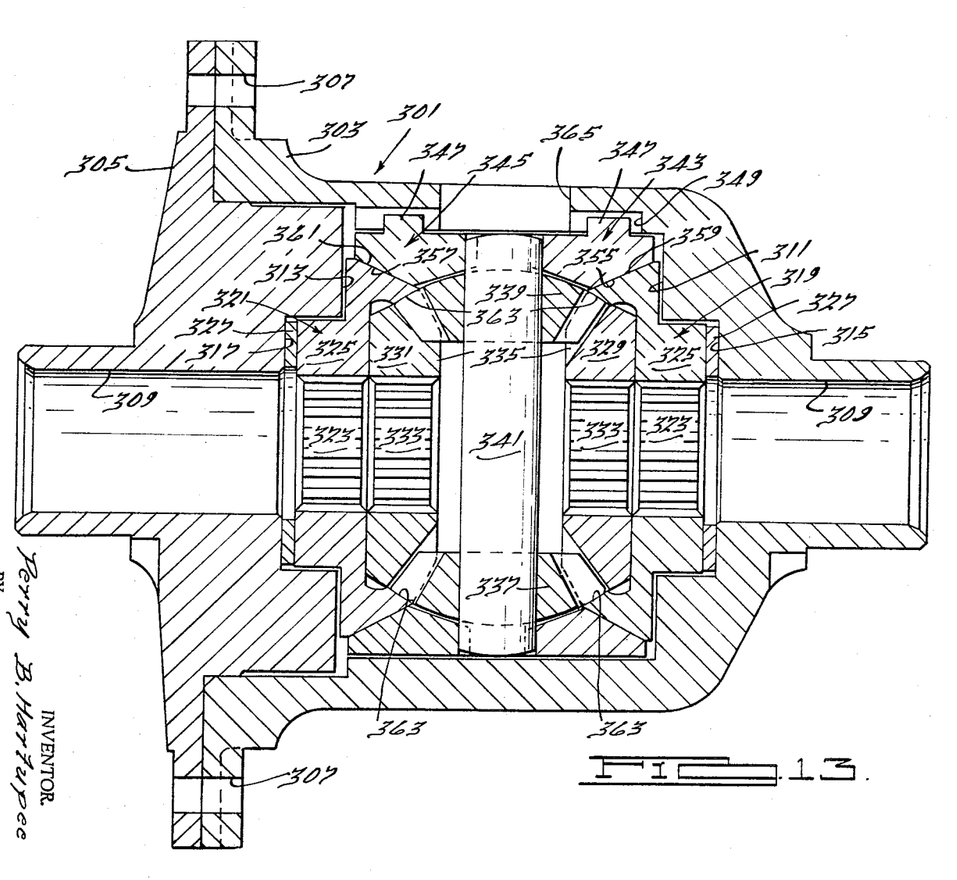
FIG. 13 is a longitudinal section similar to FIG. 1 through another form of the invention with the spider pin rotated into the plane of the paper, as compared with FIG. 14.
Figure 14:
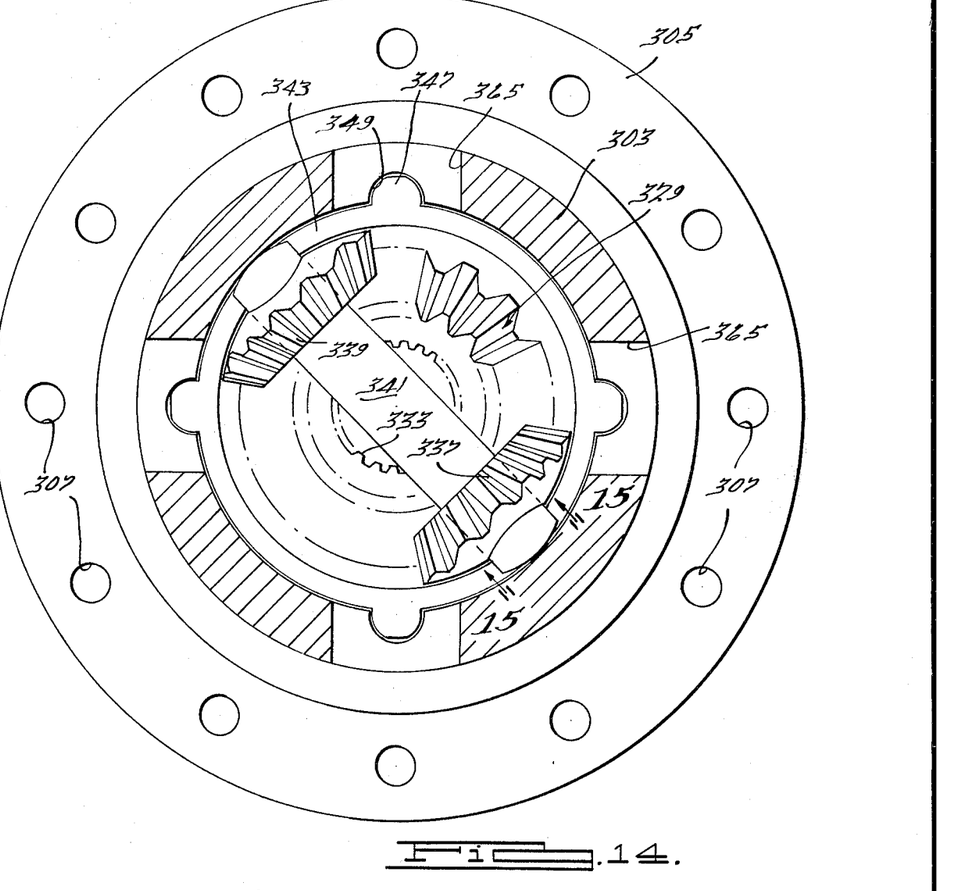
FIG. 14 is a cross section through the device of FIG. 13.
Figure 15:
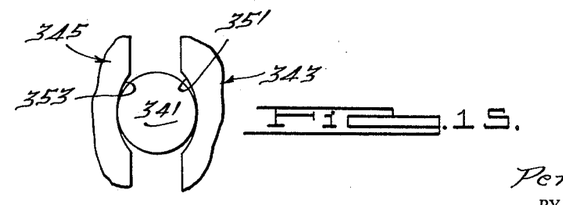
FIG. 15 is a section on line 15—15 of FIG. 14.

Turning now to FIGS. 13, 14, and 15, an embodiment of the invention similar to FIG. 1 but employing a cone-type clutch mechanism instead of clutch plates and discs is illustrated. The locking differential 301 has a two-piece case comprising a housing 303 and a cover 305 which may be bolted together and to a ring gear through aligned openings 307. The housing sections 303 and 305 have aligned hub sections 309 which will receive the axles (such at 32 and 34 in FIG. 1) for the left and right rear wheels of an automobile. The case sections 303 and 305 have, respectively, the radial faces 311 and 313 which are formed on a relatively large diameter as compared with section 309. Located axially outwardly of the faces 311 and 313 are the thrust absorbing radial faces 315 and 317, respectively. Right and left wheel cone clutch members 319 and 321 are internally splined at 323 for rotative attachment to axles for the left and right hand wheels. The cones 319 and 321 have hub sections 325 which fit in case sections 326 and engage thrust washers 327 which are located between the ends of the hubs 325 and the surfaces 315 and 317, respectively. Outward thrust on the wheel cones, such as may occur due to bouncing of the wheels, is transmitted through the thrust washers into the case rather than into the clutch surfaces or gearing to be described hereinafter.

Located inside of the wheel cones and separate from them are the right and left side gears 329 and 331 which are internally splined as at 333 to rotatively receive and drive the left and right wheel axles. The side gears 329, 331 are separate from the wheel cones 319 and 321 to enable the gear teeth and the clutch surfaces to be provided in a very small space and to minimize the cost of manufacture. In mesh with the teeth 335 on the side gears 329, 331 are a pair of pinion gears 337 and 339 which are rotatably carried on opposite ends of the floating round spider pin 341.

Surrounding the wheel cones 319 and 321, as well as the various gears, are the right and left hand pressure rings or clutch actuators and members 343 and 345, respectively. These have lugs 347 which project radially outwardly to fit into grooves 349 formed in the case section 303. Through the connection of the lugs 347 and grooves 349, the rings 343 and 345 will rotate with the case. The inner faces of the rings 343 and 345 are provided with circular cam surfaces 351 and 353 (FIG. 15) which cooperate with the round spider pin 341 as in the previous embodiments. The pressure rings 343 and 345 have conical clutch faces 355 and 357, respectively, which engage and coact with corresponding clutch faces 359 and 361 on the wheel cones 319 and 321, respectively. These engaging clutch faces are preferably formed on an angle of about 24 degrees, as indicated, which is several degrees above the lowest releasing angle of 17 degrees. Clutch thrust forces are transmitted into the case via thrust washers 327. It may be observed also that side gear thrust forces will be transmitted through wheel cone hubs 325 into thrust washers 327 independently of the clutch means and without tending to operate the clutch means. Pinion thrust forces are transmitted from the pinion teeth into inclined faces on the wheel cones as seen at 363.

The case section 303 is provided with the lubrication holes 365 as in the previous embodiments.

As can be seen in FIG. 14, the retaining rings on the spider pin are eliminated due to the fact that the cams 351 and 353 are angularly offset from the openings 365, thus offsetting the shaft 341, so that it is retained inside of the case by means of engagement with the case wall itself at opposite ends.

The operation of the differential 301 is similar in principal to that already described so that rotation of the case by the ring gear (not shown) will rotate the pressure rings 343 and 345 because of their connection to the case through the lugs 347 and grooves 349. Such rotation will cause the cam surfaces 351 and 353 to ride up on the outside circular surface of the spider pin 341, thus causing the pressure rings 343 and 345 to spread apart. This will cause their clutch faces 355 and 357 to come into tight frictional locking engagement with the surfaces 359 and 361 on the wheel cones 319 and 321. Thus, rotation will be transmitted from the case through the pressure rings into the wheel cones and therefore into the axle shaft for the left and right hand wheels.

Should the vehicle make a turn so that one wheel rotates slower than the case and the other wheel rotates faster, the pin 341 will tend to go to a neutral position relative to the cams, thus relieving the force on the engaging clutch faces of the pressure ring and wheel cone and permitting the case to rotate the spider pin and pinion gears 337 and 339 to rotate the side gears 329, 331 and thereby drive the axle at the desired different rates of speed or rotation.

In case one wheel hits a slippery spot and loses traction, the balanced condition on the spider pin will be lost and the pin will tend to move from neutral and spread the pressure rings apart to thereby lock up the device and furnish torque to both wheels through the clutch mechanism.

The embodiment of FIGS. 13–15 has several advantages over the plate clutch arrangement of FIGS. 1–7. There is only one clutch surface to release and this improves the unlocking characteristics. The unit can be made smaller and less expensively, thus opening up new applications for it—particularly in small cars. Clearances are provided between the lugs 347 and the walls of grooves 349, between the hubs 325 of the wheel cones and the case bores 326, and between the back faces of the wheel cones and the case surfaces 311 and 313. This permits the drive cones 343 and 345 to float slightly inside the case as well as the wheel cones 319 and 321. When lock up begins the conical clutch surfaces on the drive cones will act to center the wheel cones which in turn will center the axles. Clearances are also provided between the bores of the pinions and the pin 341, between the side gears 329 and 311 and the wheel cones, and between the pitch lines of the side gears and pinions so that the gear train will tend to float free during the clutch locked condition to put most or all of the load on the clutch.

The invention embodied in the three forms described above has several very desirable features. It provides a positive lock up due to the small initial angle of cam contact and high initial spreading force. The force on the clutch mechanism is a function of torque demand. Since one spider pin operates both clutches the force on both sides of the clutch means is equal and the tendency to chatter is minimized or eliminated. The high initial force equally applied to both clutch sides prevents wheel slip or spin at any condition of wheel traction. No preload on the clutch is necessary. The major portion of vehicle moving force is taken by the clutch thereby minimizing strain on the gear teeth. Since the gear spread forces are transmitted directly into the case any erratic effects of wheel traction by-pass the clutch means and allow them to function uniformly. The design is such as to eliminate shock loads on the clutch means or gear means. The multiplication of force in applying the clutch means keeps the vehicle load under close control of the driver and gives him a firm driving feel with no rear axle sway under any road conditions.

While one spider pin and two cams are preferred, certain advantages of the invention can still be obtained with two independent, floating spider pins and four cams. Other variations are also within the broader scope of the invention.

I claim:

1. A differential for receiving torque from a power source and delivering it to two separate output axles, said axles defining the axis of the differential, comprising a rotatable case, a pair of axially separated and axially movable pressure rings disposed inside said case on said axis, a pair of axially separated side gears disposed inside said case on said axis and having means for drive connection to said axles, respectively, a pair of pinions inside said case on opposite sides of said axis and each in toothed engagement with both side gears to provide a differential gearing, a spider pin extending diametrically across said axis, said pinions being rotatably mounted on opposite ends of said spider pin, said spider pin having round outer surfaces at opposite ends, said pressure rings having circular cam surfaces in contact with said spider pin surfaces to provide cam means, means connecting the pressure rings to the case to rotate at all times with the case, and providing for axial movement of the rings relative to each other and to the case, clutch means operated by axial spreading apart of the pressure rings for delivering torque from the case to said axles and substantially by-passing said differential gearing, relative movement of said spider pin surfaces and said pressure ring cam surfaces causing said axial spreading of said pressure rings to operate said clutch means.

2. The invention set forth in claim 1 wherein said pinions are mounted with clearance on said spider pin and clearance is provided between the pitch lines of the pinion and side gear teeth so that upon movement of the clutch means to lock the case to said axles substantially all torque is transmitted through the clutch means.

3. The invention set forth in claim 1 wherein there are exactly two pinions and one spider pin, no more and no less.

4. The invention set forth in claim 1 wherein the force between the spider pin and the cam surface at various operative positions of the spider pin on the pressure ring cam surface is defined by the equation $F=kT$ cotangent $X$, where F is said force, k is a constant, T is the torque applied to the case, and X is the angle of relative movement of the spider pin between its neutral position and its position at which the force is to be determined.

5. The invention set forth in claim 1 wherein said clutch means comprises axially movable clutch plates attached to the case for rotation therewith and axially movable clutch discs adapted to be frictionally driven by the clutch plates and including means for connecting the discs to said axles.

6. The invention set forth in claim 1 wherein said side gears have means transmitting side thrust from the differential gearing directly into the case independently of the clutch means.

7. The invention set forth in claim 1 wherein said case is formed of one piece having large openings in the side, said gearing and clutch means being insertable into the case through said side openings.

8. The invention set forth in claim 1 wherein said spider pin floats inside said case and is retained in position by engagement with the inside wall of the case.

9. The invention set forth in claim 1 wherein said clutch means comprises a pair of conical clutch surfaces formed on said pressure rings and a pair of wheel cones having means for drive connection to said axles and having conical clutch surfaces for frictional connection to said pressure ring clutch surfaces, said pressure rings and wheel cones being floatable to a limited extent inside said case and capable of self alignment.

10. The invention set forth in claim 9 wherein said conical clutch surfaces are formed on an angle of about 24 degrees with respect to said axis of the differential.

11. A differential comprising a rotatable case having an axis, means in the case for receiving a pair of output shafts which are located to rotate about said axis, a pair of axially spaced clutch means adapted for connection respectively to said output shafts and arranged to react against and be frictionally locked to opposite sides of said case, when locked to said case said clutch means and said output axles rotating therewith, differential gearing consisting only of a pair of side gears in the case adapted for drive connection respectively to said output shafts and a pair of pinions engaging the side gears and one spider pin rotatably carrying said pinions, a pair of pressure rings arranged to rotate with the case and to move along the axis of said case relative thereto, said rings engaging said clutch means to apply locking forces thereto, each pressure ring having a pair of cam surfaces located on a diameter thereof and facing in an inward axial direction, said cam surfaces on said two rings facing each other and being aligned with each other to form two pairs of opposed cam surfaces, said spider pin having two round portions fitting inside said two pairs of opposed cam surfaces and upon rotation of the rings relative to the spider pin acting to apply equal forces to all four cam surfaces to spread said rings apart and thereby lock each said clutch means to said case.

12. The invention set forth in claim 11 wherein the cam surfaces are circular and the force initially applied by the pin to each said cam surface and clutch means is a maximum and decreases thereafter proportionally to the cotangent of the angle of relative movement of the pin along a cam surface.

13. The invention set forth in claim 11 wherein said clutch means comprises a pair of rotatable wheel cones located to rotate about said axis and including means for connecting said cones to rotatably drive said output shafts, said wheel cones and said pressure rings having confronting conical surfaces arranged to contact and connect to each other whereby said rings rotate said cones.

14. The invention set forth in claim 13 wherein said pressure rings and wheel cones are floatable to a limited extent inside said case whereby said confronting conical surfaces are self aligning.

15. A differential comprising a rotatable case having an axis, means in the case for receiving a pair of output shafts which are located to rotate about said axis, a pair of axially spaced clutch means arranged to react against and be frictionally locked to said case, when locked to said case said clutch means rotating therewith, differential gearing in the case adapted to drive said output shafts at different speeds, said differential gearing including a spider, a pair of pressure rings arranged to rotate with the case and to move along said case relative thereto, said ring engaging said clutch means to apply locking forces thereto, each pressure ring having a pair of cam surfaces located on a diameter thereof and facing in an inward axial direction, said cam surfaces on said two rings facing and being aligned with each other to form two pairs of opposed cam surfaces, said spider having round portions fitting inside said two pairs of opposed cam surfaces and upon rotation of the rings relative to the spider pin acting to apply force to all the cam surfaces to spread said rings apart and thereby lock each said clutch means to said case, said clutch means comprising a pair of wheel cones rotatable about said axis and arranged to drive said output shafts, said wheel cones having hub portions reacting against the case, said wheel cones and said pressure rings having confronting and engageable conical clutch surfaces, said wheel cones and said pressure rings being floatable in said case to provide for automatic alignment and mutual centering of the ring and cone clutch surfaces.

16. The invention set forth in claim 15 wherein said spider comprises a single pin and said cam surfaces are circular whereby said pin applies equal forces to all cam surfaces, said forces being defined as $kT$ cotangent $X$ where $k$ is a constant, T is the applied torque and X is the angular displacement of the point of contact of the pin and cam surface from a neutral position.

17. A locking differential comprising a rotatable case; a floating rounded spider pin disposed in said case; a plurality of pinion gears, one rotatably disposed relative to the spider pin adjacent each end of said spider pin; a pair of rotatable side gears disposed in said case in engagement with said pinions; a pair of shiftable pressure rings, one disposed between each end of said case and said spider pin; said pressure rings having curved cam surfaces adapted to engage said rounded spider pin; relative movement of said spider pin and curved cam surfaces causing shifting of said pressure rings, and clutch means connected to and operated by shifting of said pressure rings and disposed for inter-acting between said case and said side gears to lock and unlock said device upon relative movement between said floating spider pin and said case.

18. A locking differential according to claim 17 wherein a portion of the structure adjacent the engagement of said pressure rings with said spider pin is relieved to provide for central contact of the pin and rings.

19. A locking differential comprising a rotatable case; a floating rounded spider pin disposed in said case; a plurality of pinion gears, one rotatably disposed relative to said spider pin adjacent each end of said spider pin; a pair of rotatable side gears disposed in said case in engagement with said pinions; a pair of axially slidable pressure rings, one disposed between each end of said case and said spider pin; said pressure rings having curved cam surfaces adapted to engage said rounded spider pin; and clutch means connected to and operated by axial sliding of said pressure rings and disposed to interact between said case and said side gears to lock and unlock said differential upon relative movement between said floating spider pin and said case; said pressure ring curved cam surfaces providing maximum and great axial force multiplication and resultant locking thrust on the clutch means at the beginning portion of the locking action.

20. A differential for delivering power to a pair of separate axles comprising a rotatable case having an axis, a pair of axially spaced clutch means in said case located to rotate about said axis, each said clutch means comprising an axle member and a drive member and a clutch face between the members, said axle members transmitting clutch thrust from the clutch faces into the case and having means for drive connection respectively to said axles, said drive members being connected to the case to rotate therewith, differential gearing inside the case comprising a pair of side gears and a pair of pinion gears in mesh with the side gears, said gearing including a spider pin carrying said pinion gears, cam means connecting the spider pin to the drive clutch members so that relative rotation about said axis between the case and spider pin actuates the cam means to apply a clutch operating force to said drive clutch members, said cam means having a neutral position wherein said differential gearing is operative, and means transmitting thrust of the side gears and pinions into said axle clutch members whereby such thrust does not tend to operate the clutch means.

21. A locking differential comprising a one-piece rotatable case having a spider pin opening and an enlarged assembly opening spaced from said spider pin opening whereby internal parts may be inserted into said case; said internal parts comprising a differential gearing and clutch mechanism including a pair of side gears for connection to a pair of axles, a pair of pinions in engagement with the side gears, and a pair of clutch means for locking said side gears to the case, said clutch means including cam means; a spider pin insertable through said spider pin opening and in engagement with the cam means; said pinions being mounted on said spider pin; and releaseable means cooperable with the spider pin retaining said spider pin inside the case.

References Cited by the Examiner
UNITED STATES PATENTS

| | | | |
|---|---|---|---|
| 1,750,981 | 3/1930 | Wildhaber | 74—711 |
| 2,778,246 | 1/1957 | Thornton | 74—711 |
| 2,966,076 | 12/1960 | O'Brien. | |
| 3,027,781 | 4/1962 | O'Brien | 74—711 |
| 3,051,020 | 8/1962 | Hartupee | 74—710.5 |

DAVID J. WILLIAMOWSKY, *Primary Examiner.*

DON A. WAITE, *Examiner.*

R. D. GRAUER, J. A. WONG, *Assistant Examiners.*